United States Patent

[11] 3,594,656

[72] Inventor Yoshihiro Tsukamoto
Hatano, Japan
[21] Appl. No. 22,182
[22] Filed Mar. 24, 1970
[45] Patented July 20, 1971
[73] Assignee Kogyo Gijutsuin
Tokyo, Japan
[32] Priority Apr. 8, 1969
[33] Japan
[31] 44/26590

[54] AUTOMATIC CLOCK FREQUENCY-SWITCHING SYSTEM
9 Claims, 4 Drawing Figs.

[52] U.S. Cl. 331/49, 328/63, 331/54
[51] Int. Cl. H03b 3/00
[50] Field of Search 331/49, 54; 328/63

*Primary Examiner*—John Kominski
*Attorneys*—William D. Hall, Elliott I. Pollock, Fred C. Philpitt, George Vande Sande, Charles F. Steininger and Robert R. Priddy

ABSTRACT: An automatic clock frequency-switching system for electric systems such as electronic computer systems comprising a clock source including a plurality of oscillators generating frequencies different from one another, and a clock frequency control capable of performing a stable operation even during the period when clock is interrupted. While the clock frequency is being switched, the supply of clock to a mechanism which is operative in response to clock pulses is stopped. After the clock frequency has been switched clock is supplied to the mechanism to resume the operation thereof.

INVENTOR
Yoshihiro Tsukamoto

BY Hall, Pollock & Vande Sande
ATTORNEY

INVENTOR

Yoshihiro Tsukamoto

BY Hall, Pollock & Vande Sande

ATTORNEY

INVENTOR

Yoshihiro Tsukamoto

BY Hall, Pollock & Vande Sande

ATTORNEY

AUTOMATIC CLOCK FREQUENCY-SWITCHING SYSTEM

BACKGROUND OF THE INVENTION

1. Field of the Invention

The present invention relates to a system for automatically switching clock frequencies.

2. Description of the Prior Art

There are no previously developed electronic computer systems having an automatic detecting function of operational tolerance in terms of clock frequencies as a parameter. Moreover, even making the clock frequency variable has scarcely been practiced. The detection or measurement of the operational tolerance of digital circuitry resulting from making the clock frequency variable has been carried out mainly in the course of the development of computers, or more particularly in experiments involving fundamental circuitry, trail production of systems and the like. The following methods which necessitates the intermediary of manual operation have been attempted to obtain a variable frequency clock in the detection or measurement of operational tolerance.

One of these is a method which employs a variable frequency oscillator as a clock pulse source, for example, a conventional standard signal oscillator.

Another of these is a method which selectively employs one of a plurality of fixed frequency oscillators of frequencies different from each other as a clock pulse source.

However, when these methods are employed for making the frequency of the clock of an electronic computer system variable, the following drawbacks arise:

1. The time required for altering the frequency is considerable.
2. The alteration of frequency cannot automatically be effected.
3. Since the switching of the frequency is performed nonsynchronously with the clocking of the computer system, the clock signal being supplied to the system is disturbed at the time of switching, resulting in the danger of a malfunctioning of the system.

According to the method employing the variable frequency oscillator which enables the frequency to be continuously varied within a certain frequency range, the disturbance to the clock is not caused by the variation of the frequency within the continuous variation range. However, when the variation of frequency is to be effected over a wider range, it is necessary to effect switching from one continuous variation range to another continuous variation range, at which time a disturbance to the clock is effected.

SUMMARY OF THE INVENTION

An object of the present invention is to provide an automatic clock frequency-switching system for electronic system including electronic computer systems which obviates the above drawbacks.

Briefly, the clock frequency automatic switching system of the present invention comprises a plurality of oscillators generating frequencies different from one another, and a clock frequency control part capable of performing a stable operation even during the clock interruption, and is operative, at the time of clock frequency switching, to interrupt the supply of a clock signal to a mechanical part (mainly a general logic part of a central processing unit) which performs its operation by clock pulses, to supply a clock signal to the mechanical part by instruction from a clock frequency control part after the clock frequency is switched, and thereafter to render the mechanical part to operate.

DESCRIPTION OF THE PREFERRED EMBODIMENT

Figure 1:
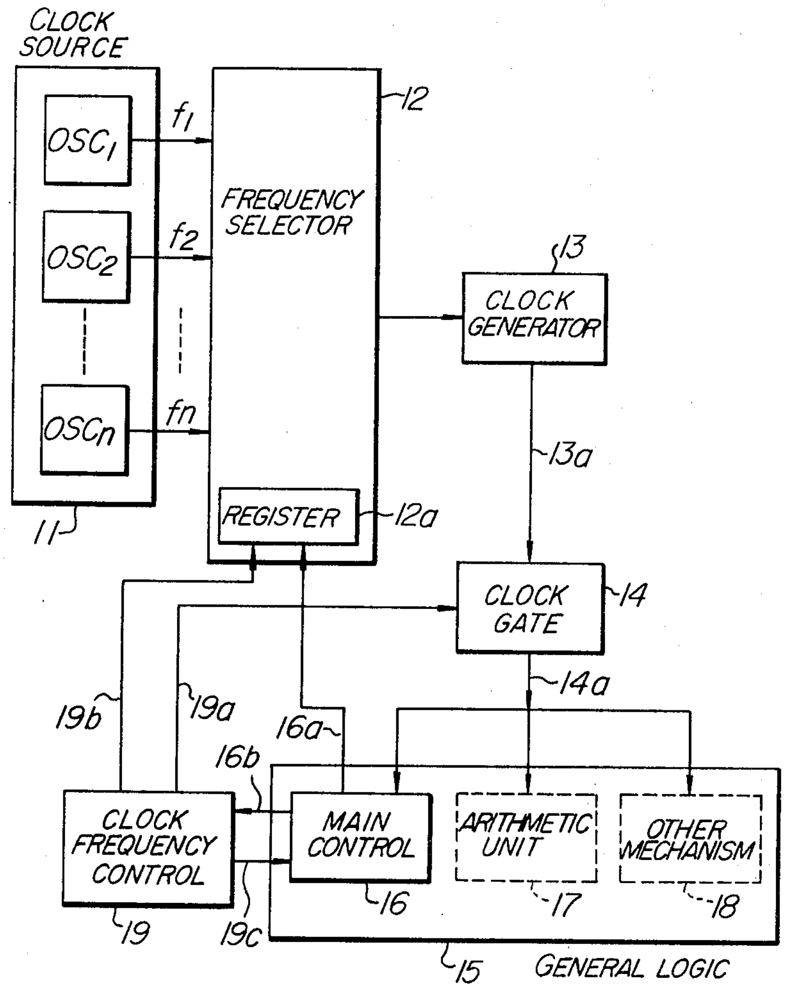
FIG. 1 is a block diagram of an embodiment of the present invention.

Referring to FIG. 1, a clock source 11 comprises frequency oscillators $OSC_1$, $OSC_2$, ..., $OSC_n$ of respective frequencies $f_1$, $f_2$, ..., $f_n$ different from one another. Although the frequencies $f_1$, $f_2$, ...$f_n$ are fixed frequencies, it is preferable that they are finely adjustable around respective frequencies $f_1$, $f_2$, ..., $f_n$. OUtput signals of the frequency oscillators $OSC_1$, $OSC_2$, ..., $OSC_n$ are supplied to a frequency selector 12 which in turn selects one of the output signals in accordance with the instruction from a main control 16 and a clock frequency control 19 described later and supplies the selected signal to a clock generator 13. The frequency selector 12 includes a register 12*a* for holding information to determine which signal is to be selected from among the *n* signals.

The clock generator 13 generates a clock signal in accordance with the frequency of a signal fed from the frequency selector 12. Fundamentally, the clock generator 13 provides standard clock pulses, but it can also determine the number of phases of the clock and the width of the clock pulse. There is a relation 1 to 1 or 1 to *n* (*n* is a positive integer) between the frequency of the clock signal generated by the clock generator 13 and the frequency of the signal fed from the frequency selector 12 to the clock generator 13. Clock pulses generated by the clock generator 13 are supplied through a signal line 13*a* to a clock gate 14 which is actuated by instruction from the clock frequency control 19 described later to transmit the clock pulses to a general logic part 15 of an electronic computer system through a signal line 14*a*.

The general logic part 15, which operates synchronously with the clock pulses, comprises a main control 16, arithmetic unit 17 and other mechanism 18 among which the main control 16 constitutes a part of the present invention. When a request for switching the clock frequency is produced at the main control 16, the main control 16 supplies information upon frequency selection for specifying the switching frequency to the frequency selector 12 through a signal line 16*a* and, at the same time, supplies a frequency-switching request signal to a clock frequency control 19 through a signal line 16*b*.

Since the clock frequency control 19 performs its operation nonsynchronously with the general logic part 15, a monostable multivibrator, a delay circuit, or a circuit operative with an independent clock is employed as the circuit of the clock frequency control 19. Upon receipt of a frequency-switching request signal from the main control 16, the clock frequency control 19 supplies a clock stop signal through a signal line 19*a* to the clock gate 14 to cease the clock pulses to be supplied to the general logic part 15, after which the clock frequency control 19 supplies a frequency-switching signal through a signal line 19*b* to the frequency selector 12 to set the frequency selection information previously supplied from the main control 16 in the register 12*a* in order to select the frequency oscillator OSC corresponding to the frequency of the information. A frequency signal generated after the switching has been effected is supplied to the clock generator 13 and further supplied to the clock gate 14 in a manner as described above. After predetermined time has elapsed from the frequency switching by the frequency selector 12, the clock frequency control 19 ceases delivering the clock stop signal through the line 19*a* to the clock gate 14 to actuate the clock gate 14 to supply clock pulses based on a new clock frequency to the general logic part 15. Thereafter, the clock frequency control 19 supplies a frequency-switching signal to the general logic part 15 through a line 19*c* to resume a general processing operation by the clock pulses based on the new clock frequency.

Now, the operation of the system of the present invention will be further described in more detail with reference to the time chart shown in FIG. 2 and an example of the clock gate 14 shown in FIG. 3*a*, the notation in FIG. 3*a* being given in FIG. 3*b*.

In the following description the operation of each part is performed under the following condition by way of example only and not for the purpose of limiting the invention:

1. The ratio between the input frequency and the output frequency of the clock generator 13 is 1 to 1.
2. The number of the phases of the clock and the width of the clock pulse are determined by the clock generator. The number of the phases is assumed to be two, i.e. $\alpha$ and $\beta$.
3. The clock frequency control 19 is constituted by a delay element.
4. The frequency is switched from $f_1$ to $f_2$ ($f_1>f_2$).
5. Rise and fall times of a signal and delay times on the signal line and logic circuit are neglected.

Figures 3A, 3B:
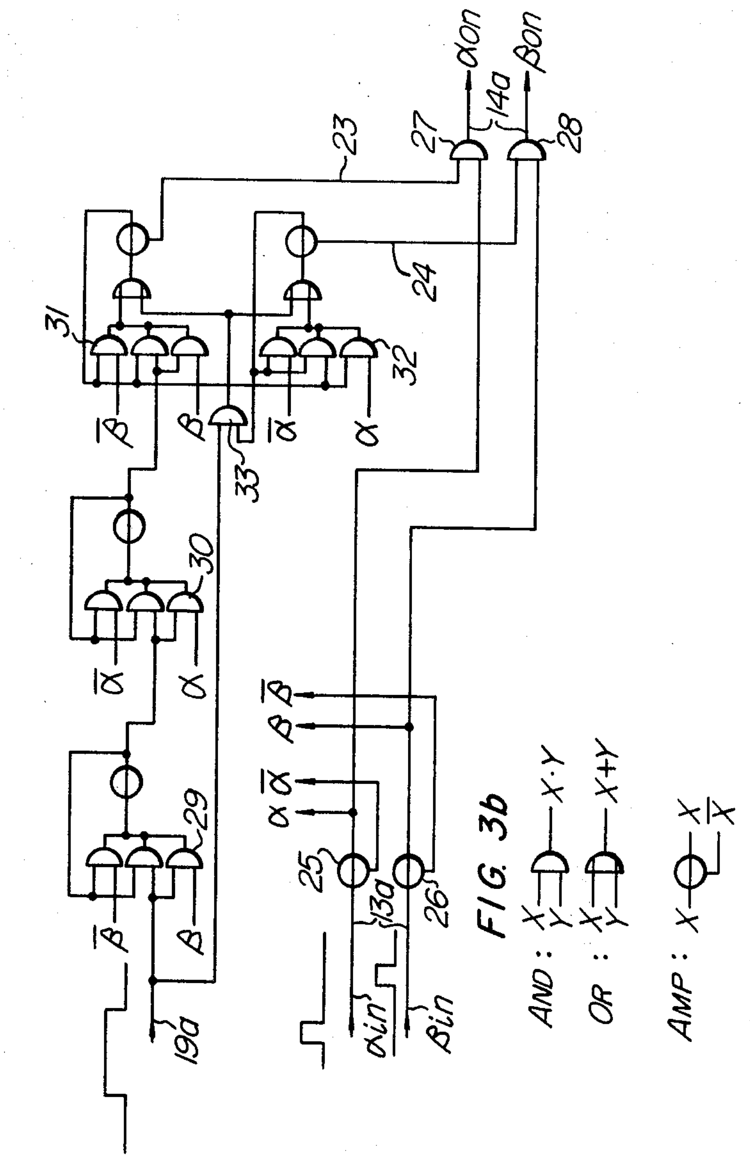
FIG. 3*a* is a logic circuit of the clock gate in the embodiment of FIG. 1.
FIG. 3*b* is notations of the logic signs employed in the logic circuit of FIG. 3*a*.

When the general logic part 15 is operating by clock pulses based on the frequency $f_1$, input clock pulses $\alpha in$ and $\beta in$ to the clock gate 14 are applied to the input lines 13*a* in FIG. 3*a* and supplied to AND gates 27 and 28 through amplifiers 25 and 26. On the other hand, $\alpha$-phase and $\beta$-phase clock gate signals on lines 23 and 24 hold a high level unless a clock stop signal is supplied on the line 19*a* by the clock frequency control 19, and hence the input pulses on the lines 13*a* appear as they are at the output lines 14*a* of the clock gate 14 as output pulses $\alpha on$ and $\beta on$.

The frequency-switching operation starts when the main control part (central processing unit) reads out a clock frequency-switching instruction from the memory, translates it and starts the operation stage of the instruction. When the operation stage starts, the following restrictions are imposed on the operation of the central processing unit:

1. During the continuation of the operation stage of the frequency-switching instruction, the transfer of information and control signals does not generally occur between the central processing unit and an apparatus which operates nonsynchronously with the central processing unit such as, for example, the main memory, input/output device or the like.
2. During the continuation of the operation stage an interruption cannot be effected.

Figure 2:
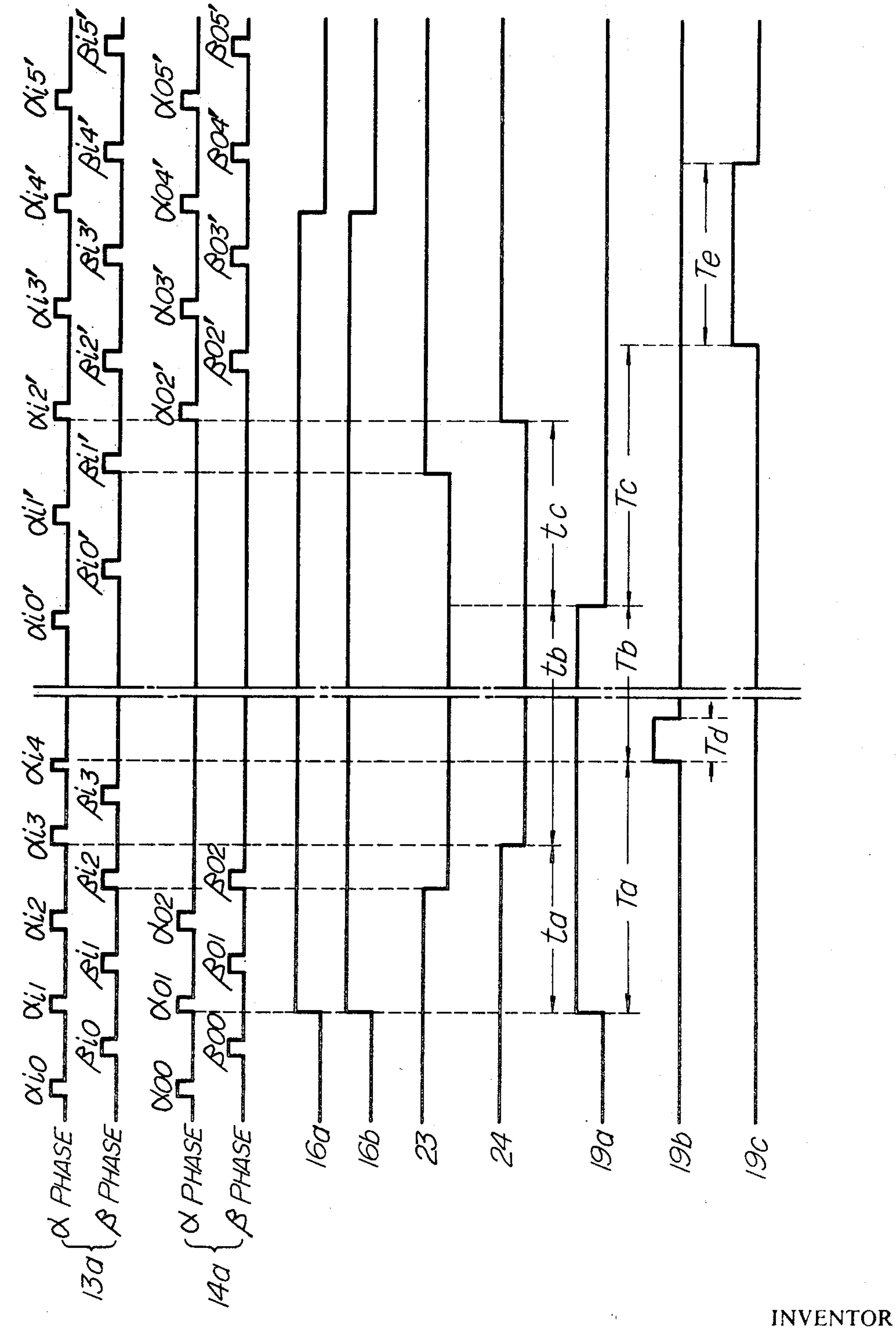
FIG. 2 is a timing chart of various signals on various connection lines of the embodiment of the invention.

The operation performed at the operation stage of the frequency-switching instruction is such that frequency selection information (a signal shown at 16*a* in FIG. 2) is supplied from the main control 16 through the line 16*a* to the frequency selector 12 in terms of a level signal and, at the same time, a frequency-switching request signal shown at 16*b* in FIG. 2 is supplied from the main control 16 through the line 16*b* to the clock frequency control 19 in terms of a level signal. These two signals are transmitted by the clock $\alpha o1$. Upon receipt of the frequency-switching request signal the clock frequency control 19 at once supplies a clock stop signal as shown at 19*a* in FIG. 2 through the line 19*a* to the clock gate 14 in terms of a level signal. The clock stop signal 19*a* passes through AND gates 29 by the clock $\beta i1$, passes through AND gates 30 by the clock $\alpha i2$, and passes through AND gates 31 by the clock $\beta i2$. The clocks $\alpha i0$, $\beta i0$, $\alpha i1$, $\beta i1$, $\alpha i2$, $\beta i2$ pass through the clock gate 14 to become output pulses $\alpha 00$, $\beta 00$, $\alpha 01$, $\beta 01$, $\alpha 02$, $\beta 02$. However, when the clock stop signal 19*a* passes through the AND gates 31 by the clock $\beta i2$, an $\alpha$-phase clock gate signal 23 becomes a low level signal to close an AND gate 27. Consequently, $\alpha$-phase clocks fed through the input lines 13*a* after the clock $\beta i2$ are not supplied as output pulses from the clock gate 14. The clock stop signal having passed through the AND gates 31 further passes through the AND gates 32 by the clock $\alpha i3$, at which time a $\beta$-phase clock gate signal 24 becomes a low level signal to close an AND gate 28. Consequently, $\beta$-phase clocks after the clock $\alpha i3$ are not supplied as output signals from the clock gate, thereby stopping the clock supply to the general logic part 15 of the computer system (mainly the central processing unit).

the supply of clock or the interruption thereof, i.e. the gating is preformed by synchronizing (by the AND gates 29 to 32) a signal from the clock frequency control 19 by the clock itself to be gated fed from the clock generator 13. Consequently, the gating is exactly synchronized with the clock to be gated, and if the gate is deactivated and then activated after a time interval of T, the clock supplied to the load (general logic part) is only such that the interval between clocks is apparently prolonged by the duration T of the deactivation of the gate. Thus, irregular disturbance to the width of clock is not caused.

After a time T*a* from the rise of the clock stop signal 19*a* the clock frequency control 19 supplies the frequency selector 12 with the frequency-switching signal 19*b*, by which the frequency selection information having already been supplied from the main control 16 is set in the register 12*a* to switch the frequency from $f_1$ to $f_2$. The clock $\alpha i4$ is cut off at an intermediate point by the frequency-switching signal 19*b*.

Between the time T*a* from the rise of the clock stop signal 19*a* to the rise of the frequency-switching signal 19*b* and the time *ta* from the rise of the clock stop signal 19*a* to the fall of the $\beta$-phase clock gate signal 24 a relation T*a* >*ta* is always made to exist. In other words, the frequency is switched after the supply of the $\alpha$- and $\beta$-phase clock pulses to the general logic part 15 is stopped.

It is sufficient for the width T*d* of the frequency-switching signal 19*b* to be long enough for the frequency selection information to be set in the register 12*a* in the frequency selector 12.

The clock frequency control 19 makes the clock stop signal 19*a* a low level after the time T*b* has elapsed from the rise of the frequency-switching signal 19*b*. The clock gate 14 detects the low level signal 19*a* by new clocks $\beta i1'$ and $\alpha i1'$ based on the frequency $f_2$ to render the $\alpha$-phase clock gate signal 23 and $\beta$-phase clock gate signal 24 to rise and supplies clock to the general logic part 15 of the computer system by clocks $\alpha 02'$ and $\beta 02'$ corresponding to the clocks $\alpha i2'$ and $\beta i2'$, respectively. However, this does not mean that the general logic part 15 at once operates by the clock. The time T*b* is made T*b*>> T*d*, and further made sufficiently larger than the time during which the disturbance of clock due to the switching of the frequency from $f_1$ to $f_2$ subsides and regular clock based on the frequency $f_2$ is supplied to the clock gate 14.

The clock frequency control 19 supplies a frequency-switching end signal 19*c* to the main control 16 after a time T*c* (T*c*>*tc*) from the fall of the clock stop signal. The main control 16 detects the frequency-switching end signal 19*c* by a clock $\alpha 04'$ to render the frequency selection information 16*a* and the frequency-switching request signal 16*b* to fall. At this time the frequency-switching stage is completed, and the control of the next stage of the operation is commenced by new clock after the frequency has been switched.

The width T*e* of the frequency-switching end signal 19*c* is such that it always sufficiently covers the period of the clock supplied to the general logic part of the central processing unit after the frequency has been switched.

The clock gate of FIG. 3*a* is a logic circuit which operates in a manner synchronized by a clock signal from the clock generator, and which does not actuate the gate by malfunction due to the influence of the possible disturbance of the clock supplied thereto at the time of frequency-switching because the output of an AND gate 33 is at a high level.

As has been described above, if the automatic clock frequency-switching system according to the present invention is employed in an electronic computer system, the detection of the operational tolerance of the computer system in terms of clock frequencies as a parameter is rapidly and automatically effected. If the computer system is of a multiple system, the rapid and automatic detection can be made one expedient of the preventive maintenance of the computer system automatically effected by a program while the computer system is operating on line, resulting in an improvement in the reliability of the computer system.

I claim:

1. A system for switching clock frequencies comprising:

a. a general logic part including a main control, said main control being operative in response to clock pulses for generating frequency selection information and a frequency-switching request signal at the time of frequency switching, b. a clock frequency control for generating a clock stop signal and a frequency-switching signal upon receipt of said frequency-switching request signal from said main control and supplying a frequency-switching end signal to said main control after the end of frequency-switching operation.

c. a clock source including a plurality of oscillators of oscillation frequencies different from one another, d. a frequency selector for selecting one of said oscillators by the reception of said frequency selection information from said main control and said frequency-switching request signal from said clock frequency control.

e. a clock generator connected to said frequency selector for generating at least fundamental clock pulses, and f. a clock gate for gating said clock pulses from said clock generator in response to said clock stop signal from said clock frequency control and supplying said clock pulses to at least said main control.

2. A system for switching clock frequencies according to claim 1, wherein said main control is operative to generate frequency selection information and a frequency-switching request signal at the operation stage of a frequency-switching instruction.

3. A system for switching clock frequencies according to claim 1, wherein said clock frequency control performs its operation nonsynchronously with said general logic part.

4. A system for switching clock frequencies according to claim 1, wherein said general logic part is such that during the continuation of the operation stage of a frequency-switching instruction, the transfer of information and control signals does not occur between said general logic part and and apparatus which operates nonsynchronously with said general logic part.

5. A system for switching clock frequencies according to claim 1, wherein said oscillation frequencies of said oscillators in said clock source are fixed frequencies.

6. A system for switching clock frequencies according to claim 1, wherein each of said oscillators in said clock source is finely adjustable in its oscillation frequency around its proper frequency.

7. A system for switching clock frequencies according to claim 1, wherein said clock generator generates an output clock signal in response to an input clock signal, the frequencies of said input and output clock signals having a relation of $n$ to 1 ($n$ is a positive integer including 1) therebetween.

8. A system for switching clock frequencies according to claim 1, wherein said clock gate is actuated by synchronizing the signal from said clock frequency control with clock to be gated supplied from said clock generator, whereby said clock gate is prevented from malfunctioning resulting from disturbance of the output of said clock generator at the time of clock frequency switching.

9. A system for switching clock frequencies according to claim 1, wherein said frequency control performs a control such that said frequency selector switches the frequency after said clock gate stops the supply of clock pulses.